United States Patent [19]
Glickstein et al.

[11] Patent Number: 5,392,595
[45] Date of Patent: Feb. 28, 1995

[54] ENDOTHERMIC FUEL ENERGY MANAGEMENT SYSTEM

[75] Inventors: Marvin R. Glickstein, North Palm Beach, Fla.; Leland L. Coons, Marlborough, Conn.

[73] Assignee: United Technologies Corporation, Hartford, Conn.

[21] Appl. No.: 103,603

[22] Filed: Aug. 6, 1993

[51] Int. Cl.6 .......................... F02C 3/28; F02C 7/224
[52] U.S. Cl. ................................ 60/39.02; 60/39.12; 60/736
[58] Field of Search ............... 60/39.02, 39.12, 39.462, 60/736, 267

[56] References Cited

U.S. PATENT DOCUMENTS

| | | | |
|---|---|---|---|
| 3,167,913 | 2/1965 | Muhlberg et al. | 60/39.02 |
| 3,334,486 | 8/1967 | Scholz | 60/39.02 |
| 3,733,826 | 5/1973 | Wolf et al. | 60/267 |
| 4,949,544 | 8/1990 | Hines | 60/736 |
| 5,161,365 | 11/1992 | Wright | 60/39.02 |
| 5,165,224 | 11/1992 | Spadaccini et al. | 60/39.02 |

*Primary Examiner*—Louis J. Casaregola
*Attorney, Agent, or Firm*—Christopher T. Hayes

[57] ABSTRACT

A method for managing the energy produced by a gas turbine engine, which includes utilizing an endothermic fuel to cool the combustion products in the exhaust section of the gas turbine engine prior to burning the fuel in the combustion section of the engine.

7 Claims, 2 Drawing Sheets

ENDOTHERMIC FUEL ENERGY MANAGEMENT SYSTEM

FIELD OF THE INVENTION

This invention relates to a method for managing the energy produced by a gas turbine engine.

BACKGROUND OF THE INVENTION

One of the considerations in selection of gas turbine engine for a particular application is the overall thermodynamic efficiency of the engine. For aircraft operators such as commercial airlines, thermodynamic efficiency is critical to operating the airline at a profit. Military operators of aircraft are likewise concerned about thermodynamic efficiency, since thermodynamic efficiency determines the effective range of a particular aircraft.

The thermodynamic efficiency of industrial gas turbines, such as those used to generate electricity, directly affects the cost of operation thereof. Lower thermodynamic efficiency results in higher costs to the consumer, and/or lower profits to the electric power industry. Therefore, there is an ongoing pursuit to increase the thermodynamic efficiency of gas turbine engines.

What is needed is a method of providing efficient energy management of a gas turbine engine to yield a significant increase in the overall thermodynamic efficiency thereof.

SUMMARY OF THE INVENTION

It is therefore an object of the present invention to provide a method for increasing the overall thermodynamic efficiency of a gas turbine engine.

According to the present invention a method is disclosed in which an endothermic fuel recovers heat energy from the combustion products of a gas turbine engine downstream of the turbine, and returns that energy to the combustion section of the engine upstream of the turbine. One embodiment of the present invention uses bleed air from the compressor section, which is then further compressed, as a heat source to decompose the endothermic fuel into high pressure gases in the presence of a catalyst. Another embodiment uses the heat energy of the combustion products downstream of the turbine as the heat source to decompose the endothermic fuel into high pressure gases in the presence of a catalyst. The method of the present invention results in a reduction in net specific fuel consumption and a reduction in exhaust temperature, which in turn yields reduced levels of fuel consumption and exhaust product emissions.

The foregoing and other features and advantages of the present invention will become more apparent from the following description and accompanying drawings.

DETAILED DESCRIPTION OF THE INVENTION

Figure 1:
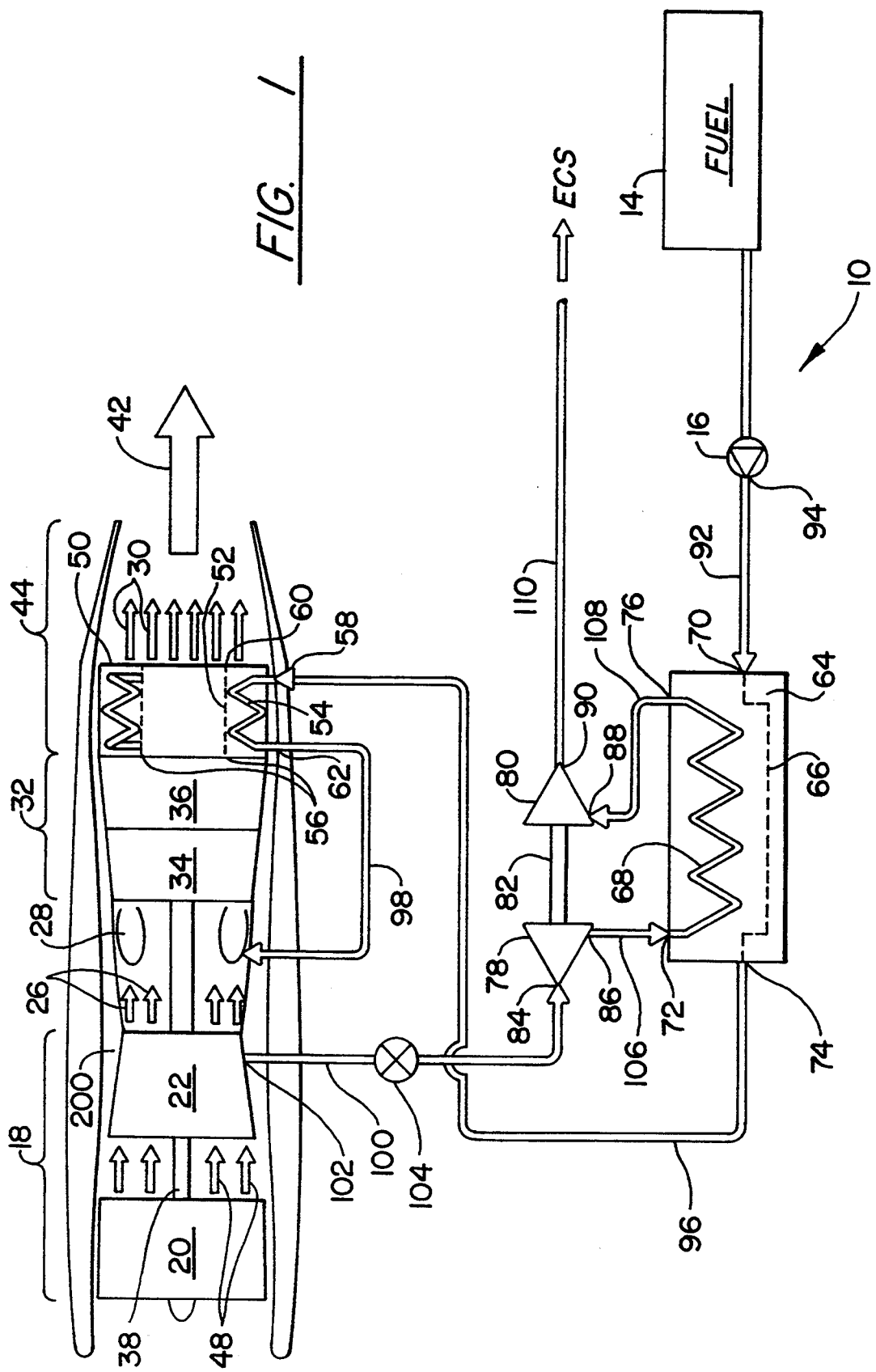
FIG. 1 is a schematic view of the components of the first embodiment of the method of the present invention for a vehicle powered by a turbofan gas turbine engine.

The present invention provides a method for utilizing the large heat sink capacity of endothermic hydrocarbon fuels to manage the energy flow in gas turbine engines in a manner providing improved thermodynamic efficiency thereof. The method involves managing the energy produced by a gas turbine engine, and is applicable to vehicles such as aircraft which are powered by turbojet, turbofan and turboshaft engines, as well as stationary applications thereof. In the preferred embodiment of the present invention, the method is shown and described in terms of a turbofan engine 12 which uses an endothermic fuel source 14 that supplies the fuel to the engine 12 via a fuel pump 16. The engine 12 includes, in serial flow arrangement, a compressor section 18 for compressing ambient air, and the compressor section 18 has, in serial flow arrangement, a low pressure compressor 20, or "fan", and a high pressure compressor 22, to produce compressed air 26. Aft of the compressor section 18 is a combustor section 28 for mixing fuel with the compressed air 26 and igniting the fuel and compressed air 26 to produce combustion products 30. Aft of the combustion section 28 is a turbine section 32 for expanding the combustion products 30 and driving the compressors 20, 22 of the compressor section 18. The endothermic fuel source 14 is essentially at ambient conditions, while the combustion products 30 are at a substantially higher temperature.

The turbine section 32 of the turbofan 12 also has in serial flow arrangement, a high pressure turbine 34 and a low pressure turbine 36. The low pressure turbine 36 drives the fan 20 via the low shaft 38 which connects the low pressure turbine 36 to the fan 20, and the high pressure turbine 34 drives the high compressor 22 via the high shaft 40 which connects the high pressure turbine 34 to the high compressor 22. Aft 42 of the turbine section 32 is an exhaust section 44 for conveying the combustion products 30 from the turbine section 32 out of the gas turbine engine 12. A bypass duct 200, the radially outer boundary of which is defined by the engine case 46, connects the exhaust section 44 to the outlet of the low compressor 20 to permit fan air 48 to bypass the high compressor 22, combustion section 28, and turbine section 32.

As shown in FIG. 1, the method utilizes a recuperative heat exchanger 50 located in the exhaust section 44 of the engine 12. The recuperative heat exchanger 50 may be located adjacent to, or incorporated into, the engine case 46. The recuperative heat exchanger 50 has first 52 and second 54 flow paths extending therethrough, and each flow path 52, 54 has an inlet 56, 58 and an outlet 60, 62.

The first flow path 52 of the recuperative heat exchanger 50 is exposed to the combustion products 30, and the combustion products 30 flow through the first flow path 52 thereof. The method also utilizes a second heat exchanger, that being a heat exchanger/reactor 64. The heat exchanger/reactor 64 has first 66 and second 68 flow paths extending therethrough, and each flow path has an inlet 70, 72 and an outlet 74, 76. The heat exchanger/reactor 64 is a combined air-fuel heat exchanger and catalytic converter. The catalyst, specifically selected based on the desired endothermic fuel, is coated or packed within the heat exchanger/reactor 64 in a manner such that the fuel flowing through the heat exchanger/reactor 64 is in intimate contact with the catalyst.

Additionally, the method uses an auxiliary unit which includes an auxiliary compressor 78 and an auxiliary turbine 80, and the auxiliary turbine 80 is connected to the auxiliary compressor 78 by an auxiliary shaft 82 to provide power thereto. The auxiliary compressor 78 has an inlet 84 and an outlet 86, and the auxiliary turbine 80 likewise has an inlet 88 and an outlet 90.

A first conduit is connected at one end to the fuel pump outlet 94 and at the other end to the inlet 70 of the first flow path 66 of the heat exchanger/reactor 64. The outlet 74 of the first flow path of the heat exchanger/reactor 64 is connected by a second conduit 96 to the inlet 58 of the second flow path 54 of the recuperative heat exchanger 50 to deliver the fuel exiting the first flow path 66 of the heat exchanger/reactor 64 thereto. The outlet 62 of the second flow path 54 is connected by a third conduit 98 to the combustion section 28 of the engine 12 to deliver the fuel exiting the second flow path 54 to the combustion section.

The inlet 84 of the auxiliary compressor 78 is connected by a fourth conduit 100 to a high compressor bleed 102 that diverts compressed air 26 from the high compressor 22. The fourth conduit 100 preferably includes a flow control valve 104 to regulate flow of compressed air 26 that flows through the fourth conduit 100. The outlet 86 of the auxiliary compressor 78 is connected by a fifth conduit 106 to the inlet 72 of the second flow path 68 of the heat exchanger/reactor 64. The outlet 76 of the second flow path of the heat exchanger/reactor 64 is connected by a sixth conduit 108 to the inlet 88 of the auxiliary turbine 80 to deliver compressed air 26 exiting the second flow path 108 of the heat exchanger/reactor 64 thereto. The outlet 90 of the auxiliary turbine 80 is connected to a seventh conduit 110 which routes the compressed air 26 away from the auxiliary turbine 80.

In operation, fuel from the fuel source 14 is pumped by the fuel pump 16 through the first conduit 92, delivered to the inlet 70 of the first flow path of the heat exchanger/reactor 64, and flows through the first flow path 66 thereof. A portion of the compressed air 26 from the high compressor 22 is diverted from the high pressure compressor 22 through the high compressor bleed 102. The portion flowing from the high compressor 22 through the fourth conduit 100 is delivered to the inlet 84 of the auxiliary compressor 78.

The portion is then further compressed in the auxiliary compressor 78, thereby increasing the pressure and temperature of the portion exiting the outlet 86 of the auxiliary compressor 78. Within the heat exchanger/reactor 64, the portion is cooled simultaneously with the heating of the fuel flowing through the first flow path 66 thereof. In the presence of the catalyst, the heated fuel decomposes into gaseous hydrogen and gaseous hydrocarbons, resulting in a large attendant absorption of heat. The gaseous fuel then exits the first flow path of the heat exchanger/reactor 64 through the outlet 74 thereof, and the portion of compressed air 26 then exits the second flow path 68 through the outlet 76 thereof.

The portion of compressed air 26 exiting the heat exchanger/reactor 64 is delivered to the auxiliary turbine 80 through the sixth conduit 108 and expanded through the auxiliary turbine 80, thereby further reducing the temperature of the second portion and producing work to drive the auxiliary compressor 78 via the auxiliary shaft 82. The portion of compressed air 26 exiting the auxiliary turbine 80 is then routed through the seventh conduit 110 and is available for cooling engine components. The gaseous fuel exiting the heat exchanger/reactor 64 is delivered through the second conduit 96 to inlet 58 of the second flow path of the recuperative heat exchanger 50 and flows through the second flow path 54 thereof, and the combustion products 30 flowing from the turbine section 32 flow into the inlet 56 of the first flow path of the recuperative heat exchanger 50 and flow through the first flow path 52 thereof.

Within the recuperative heat exchanger 50, the combustion products 30 are cooled simultaneously with the heating of the gaseous fuel through the transfer of heat energy from the combustion products 30 to the gaseous fuel. The combustion products 30 then exit the first flow path 52 of the recuperative heat exchanger through the outlet 60 thereof, and the gaseous fuel exits the second flow path 54 of the recuperative heat exchanger through the outlet 62 thereof. The gaseous fuel exiting the recuperative heat exchanger 50 is delivered through the third conduit 98 to the combustion section 28 where it is mixed with compressed air 26 exiting the high compressor 22, ignited, and combusted.

By using an endothermic fuel to cool the combustion products 30 and/or the turbine case 46 in the exhaust section the total heat extractable by the fuel from the combustion products 30 in the exhaust section can represent more than 10% of the net heating value of the fuel. This energy, which is carried to the combustion section 28 by the fuel, represents a reduction in specific thrust produced by the combustion products 30 exiting the exhaust section 44, but an even greater increase in potential power available to the turbines 34, 36. The overall effect of this energy transfer from the exhaust section 44 to the combustion section 28 is a net increase in thermodynamic efficiency of the engine cycle.

As an alternative to incorporating a recuperative heat exchanger 50 in the exhaust section 44, the fuel can be delivered to the vanes (not shown) of the high 34 and/or low 36 turbine in order to provide cooling thereof. Turbine vanes are conventionally cooled with air from the high compressor 22, which results in attendant performance losses due to injection of this unburned air in the turbine section 32. Cooling of the stationary turbine components with fuel allows a substantial reduction in the amount of required turbine cooling air, and provides a means to transport heat, extracted from the latter portion of the turbine, back to the combustion section 28 upstream of the high pressure turbine 34. If it is undesirable to feed the fuel directly into the turbine components, an intermediary heat transfer fluid may be used to transport heat from the turbine to another external heat exchanger/reactor.

Figure 2:
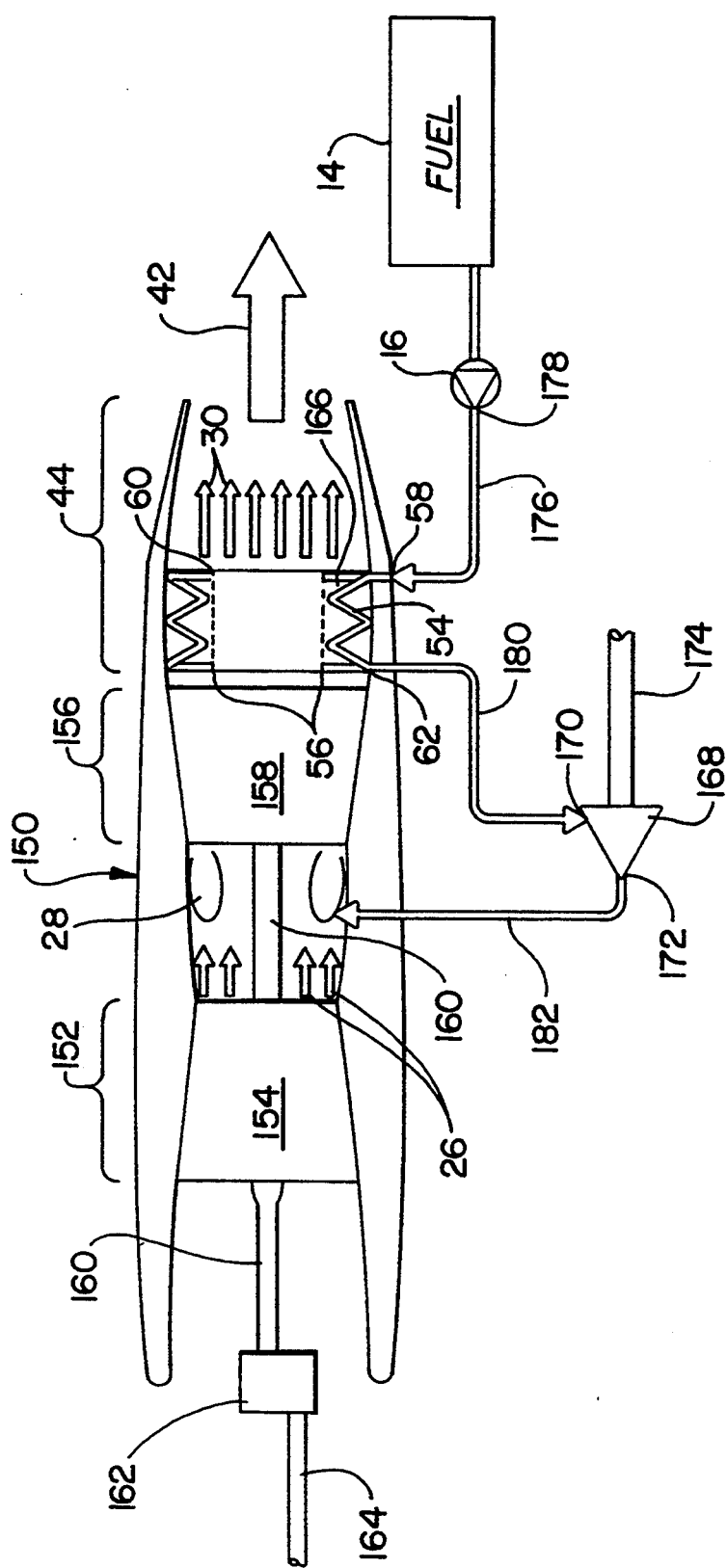
FIG. 2 is a schematic view of the components of the second embodiment of the method of the present invention as used with a turboshaft gas turbine engine.

FIG. 2 illustrates a second embodiment of the method of the present invention modified for use on a turboshaft engine 150. As compared to the turbofan 12, the compressor section 152 of the turboshaft has a single compressor 154, and the turbine section 156 has a single turbine 158. The turbine 158 drives the compressor 154 via the engine shaft 160 which connects the turbine 158 to the compressor 154. Otherwise, the fuel pump 16 connected to a source 14 of endothermic fuel, and the elements of the turboshaft 150 are the same as those shown for the turbofan 12 in FIG. 1. Additionally, a gear box 162 having an output shaft 164 is connected to the engine shaft 160, for increasing or decreasing the rotational velocity of the output shaft 164 relative to the rotational velocity of the engine shaft 160.

As in the first embodiment, the exhaust section 44 of the turboshaft 150 utilizes a recuperative heat exchanger/reactor 166 located adjacent to, or incorporated into, the engine case. The recuperative heat exchanger/reactor 166 has first 52 and second 54 flow paths extending therethrough, and each flow path has an inlet 56, 58 and an outlet 60, 62. The first flow path 52 of the recuperative heat exchanger/reactor 166 is exposed to the combustion products 30, and the combustion products 30 flow through the first flow path 52 thereof. The recuperative heat exchanger/reactor 166 of the second embodiment is similar to the recuperative heat exchanger of the first method, except that the second flow path 54 of the recuperative heat exchanger/reactor 166 has a catalyst coated or packed therein in a manner such that the fuel flowing through the second flow path 54 of the recuperative heat exchanger/reactor 166 is in intimate contact with the catalyst. An auxiliary turbine 168 having an inlet 170 and an outlet 172 is likewise provided, and the auxiliary turbine 168 is connected to a power take-off shaft 174 to provide mechanical energy to power accessories as desired.

A first conduit 176 is connected at one end to the fuel pump outlet 178 and at the other end 19 the inlet 58 of the second flow path of the recuperative heat exchanger/reactor 166. The outlet 62 of the second flow path 54 of the recuperative heat exchanger/reactor 166 is connected by a second conduit 188 to the inlet 170 of the auxiliary turbine 168 to deliver the fuel exiting the second flow path 54 of the recuperative heat exchanger/reactor 166 thereto. The outlet 172 of the auxiliary turbine 168 is connected to a third conduit 182 which routes the gaseous fuel to the combustion section 28 of the turboshaft 150.

In operation, the combustion products 30 flowing from the turbine section 156 flow into the inlet 56 of the first flow path of the recuperative heat exchanger/reactor 166 and flow through the first flow path 52 thereof. Endothermic fuel from the fuel source 14 is pumped by the fuel pump 16 through the first conduit 176, is delivered to the inlet 58 of the second flow path of the recuperative heat exchanger/reactor 166, and flows through the second flow path 54 thereof. Within the recuperative heat exchanger/reactor 166, the combustion products 30 are cooled simultaneously with the heating, decomposition, and gasification of the fuel in the second flow path 54 through the transfer of heat energy from the combustion products 30 to the fuel. The combustion products 30 then exit the first flow path 52 of the recuperative heat exchanger/reactor 166 through the outlet 60 thereof, and the gaseous fuel exits the second flow path 54 of the recuperative heat exchanger/reactor 166 through the outlet 62 thereof. The gaseous fuel exiting the recuperative heat exchanger/reactor 166 is delivered to the inlet 170 of the auxiliary turbine 168 through the second conduit 180 and expanded through the auxiliary turbine 168. The power extracted by the auxiliary turbine 168 via the power take-off shaft 174 can be used to satisfy mechanical power or accessory requirements, instead of using mechanical power extraction from the engine 150. The gaseous fuel exiting the outlet 172 of the auxiliary turbine is delivered through the third conduit 182 to combustion section 28 where it is mixed with compressed air 26 exiting the compressor 154, ignited, and combusted.

By pumping the endothermic fuel to high pressure prior to delivering the fuel to the recuperative heat exchanger/reactor 166 to absorb energy from the combustion products 30 in the exhaust section 44, the gaseous fuel provides an excellent working fluid for expansion in the auxiliary power turbine 168. The heated reaction products are composed of mixtures of hydrogen and light hydrocarbon gases, and provide a potential for a large source of mechanical power. The regenerative recovery of energy from the combustion products 30 in the exhaust section 44 of turboshaft engines, and stationary power plants as well, provides a means of improving the overall cycle efficiency.

Although the first embodiment of this invention has been shown and described with respect to a turbofan, it will be understood by those skilled in the art that the first embodiment can be used on a turbojet or turboshaft as well, since the method is not dependent on the differences between turbofan, turboshaft, and turbojet engines. Likewise, although the second embodiment of this invention has been shown and described with respect to a turboshaft, the second embodiment can be used on a turbofan or turbojet as well, since the method is not dependent on the differences between turbofan, turboshaft, and turbojet engines.

We claim:

1. A method of recovering thermal energy from combustion products of a vehicle, said method comprising:
   providing at least one gas turbine engine in said vehicle, said engine having in serial flow arrangement
   a compressor section having in serial flow arrangement a low pressure compressor and a high pressure compressor, said compressor section for compressing ambient air thereby producing compressed air,
   a combustion section for mixing fuel with said compressed air and igniting said fuel and compressed air to produce said combustion products,
   a turbine section for expanding said combustion products and driving the compressor section, and
   an exhaust section for conveying said combustion products from said turbine section and out of said gas turbine engine;
   providing a first heat exchanger located in said exhaust section and exposed to said combustion products, said heat exchanger having first and second flow paths extending therethrough, each flow path having an inlet and an outlet and providing a second heat exchanger having third and fourth flow paths extending therethrough, each flow path having an inlet and an outlet;
   providing a combustible fuel source;
   flowing said combustion products through the first flow path of said first heat exchanger;
   pumping fuel from said source to the combustion section of said engine by flowing said fuel to the inlet of said third flow path, flowing said fuel through the third flow path, and flowing said fuel out the exit of the third flow path, flowing the fuel through the second flow path of said first heat exchanger, thereby heating said fuel while simultaneously cooling said combustion products;
   diverting a portion of said compressed air from said high pressure compressor:
   cooling said portion by delivering said portion to the inlet of said fourth flow path, and flowing said portion through said fourth flow path, thereby simultaneously cooling said portion and heating said fuel through the transfer of heat energy from said portion to the fuel flowing through the third flow path, and flowing said portion out the exit of said fourth flow path; and,
   using said portion that has been cooled to cool heat absorbing components of said vehicle.

2. The method of claim 1 wherein said vehicle includes an auxiliary unit having an auxiliary compressor and an auxiliary turbine, said auxiliary turbine connected to said auxiliary compressor by a shaft to provide power thereto, and the step of diverting said portion is followed by the step of delivering said portion to said auxiliary compressor and compressing said portion, thereby increasing the pressure and temperature of said portion, and flowing said portion out of the auxiliary compressor.

3. The method of claim 2 wherein the step of cooling said second portion is followed by the step of delivering said portion exiting the fourth flow path-to said auxiliary turbine and expanding said portion through said auxiliary turbine, thereby further reducing the temperature of the portion and producing work to drive the auxiliary compressor via said shaft.

4. The method of claim 6 wherein the fuel is an endothermic fuel, and the third flow path includes a catalyst that decomposes the endothermic fuel into constituents thereof.

5. The method of claim 4 wherein said endothermic fuel decomposes into high pressure gaseous fuel.

6. A method of recovering thermal energy from combustion products, said method comprising:

providing a gas turbine engine having an auxiliary turbine, said auxiliary turbine having an auxiliary shaft for providing power to mechanical accessories, and said engine having in serial flow arrangement a compressor section for compressing ambient air thereby producing compressed air, a combustion section for mixing fuel with said compressed air and igniting said fuel and compressed air to produce said combustion products.

a turbine section for expanding said combustion products and driving the compressor section, and an exhaust section for conveying said combustion products from said turbine section and out of said gas turbine engine;

providing a heat exchanger located in said exhaust section and exposed to said combustion products to transfer heat therefrom, said heat exchanger having first and second flow paths extending therethrough, each flow path having an inlet and an outlet and second flow path includes a catalyst;

providing a combustible fuel source of an endothermic fuel;

flowing said combustion products through the first flow path of said first heat exchanger;

pumping said fuel from said source to said heat exchanger;

flowing said fuel through the second flow path, thereby transferring energy from said combustion products to said fuel in the presence of the catalyst, decomposing the endothermic fuel into high pressure gaseous fuel; and, delivering said gaseous fuel exiting said heat exchanger to said auxiliary turbine and expanding said gaseous fuel through said auxiliary turbine, thereby providing work to drive the shaft; and, delivering said fuel exiting said turbine to the combustion section of said engine.

7. The method of claim 6 wherein said engine is a turboshaft engine, said compressor section includes a compressor attached to a shaft, said turbine section includes a turbine attached to said shaft, and a gear box is connected to said shaft.

* * * * *

UNITED STATES PATENT AND TRADEMARK OFFICE
CERTIFICATE OF CORRECTION

PATENT NO. : 5,392,595
DATED : February 28, 1995
INVENTOR(S) : Glickstein et al.

It is certified that error appears in the above-indentified patent and that said Letters Patent is hereby corrected as shown below:

```
In column 5, at line 20, change "19" to --to--.
In column 7, at line 15, change "path-to" to --path to--.
In column 7, in the first line of claim 4, change "claim 6" to
    --claim 3--.
In column 8, at line 3, change "." to --,--.
In column 8, at line 14, after "and" insert --the--.
```

Signed and Sealed this

Thirteenth Day of June, 1995

*Attest:*

BRUCE LEHMAN

*Attesting Officer*  *Commissioner of Patents and Trademarks*